(12) United States Patent
Ni et al.

(10) Patent No.: US 10,237,883 B2
(45) Date of Patent: Mar. 19, 2019

(54) METHOD, SYSTEM AND DEVICE FOR SCHEDULING RESOURCE

(71) Applicant: China Academy of Telecommunications Technology, Beijing (CN)

(72) Inventors: Hao Ni, Beijing (CN); Quibin Gao, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 391 days.

(21) Appl. No.: 14/761,261

(22) PCT Filed: Jan. 20, 2014

(86) PCT No.: PCT/CN2014/070890
§ 371 (c)(1),
(2) Date: Jul. 15, 2015

(87) PCT Pub. No.: WO2014/111051
PCT Pub. Date: Jul. 24, 2014

(65) Prior Publication Data
US 2015/0358989 A1   Dec. 10, 2015

(30) Foreign Application Priority Data

Jan. 21, 2013   (CN) .......................... 2013 1 0021980

(51) Int. Cl.
*H04W 72/12*    (2009.01)
*H04W 72/08*    (2009.01)
(Continued)

(52) U.S. Cl.
CPC ........ *H04W 72/1226* (2013.01); *H04B 7/024* (2013.01); *H04B 7/0626* (2013.01);
(Continued)

(58) Field of Classification Search
CPC .............. H04B 7/024; H04W 72/1226; H04W 72/1231; H04W 72/1236
See application file for complete search history.

(56) References Cited

U.S. PATENT DOCUMENTS

2009/0197590 A1* 8/2009 Borran ................ H04W 52/242
455/423
2011/0249642 A1* 10/2011 Song ..................... H04W 28/16
370/329
(Continued)

FOREIGN PATENT DOCUMENTS

CN       101373998 A      2/2009
CN       101789815        7/2010
(Continued)

OTHER PUBLICATIONS

Author Unknown, Solution for the Autonomous Optimization of the Operational Carrier, Mar. 30, 2011, pp. 1-7.*
(Continued)

*Primary Examiner* — Christopher M Crutchfield
(74) *Attorney, Agent, or Firm* — Foley & Lardner LLP

(57) ABSTRACT

The embodiments of the present application relate to the technical field of wireless communications, and in particular, to a method, system and device for scheduling a resource, which are used for solving the problems that the realization of non-central coordinated scheduling using an iterative method needs to perform iterative scheduling information interaction, and scheduling time delay will obviously increase in the case of a relatively large X2 interface time delay in the prior art. The method of the embodiments of the present application comprises: a serving base station determining a time-frequency resource needing to be silenced by a cooperative base station according to channel information reported by a user equipment adopting coordinated multi-point (CoMP) transmission technology, and notifying the (Continued)

cooperative base station of the time-frequency resource needing to be silenced; and scheduling the user equipment according to a received notification about whether to silence the resource from the cooperative base station. The adoption of the solution of the embodiments of the present invention reduces the scheduling time delay in the case of a relatively large X2 interface time delay, and improves the efficiency of information scheduling and the system performance.

14 Claims, 5 Drawing Sheets

(51) Int. Cl.
    *H04W 74/00*     (2009.01)
    *H04B 7/024*     (2017.01)
    *H04B 7/06*     (2006.01)
    *H04W 88/08*     (2009.01)
    *H04W 92/20*     (2009.01)

(52) U.S. Cl.
    CPC ..... *H04W 72/082* (2013.01); *H04W 72/1231* (2013.01); *H04W 74/006* (2013.01); *H04W 88/08* (2013.01); *H04W 92/20* (2013.01)

(56) References Cited

U.S. PATENT DOCUMENTS

| | | | | |
|---|---|---|---|---|
| 2013/0021929 A1* | 1/2013 | Kim | ....................... | H04B 7/024 370/252 |
| 2013/0044704 A1* | 2/2013 | Pang | ................. | H04W 72/0426 370/329 |
| 2013/0244709 A1* | 9/2013 | Davydov | .......... | H04W 28/0268 455/501 |
| 2015/0071191 A1* | 3/2015 | Kim | ..................... | H04L 5/0057 370/329 |

FOREIGN PATENT DOCUMENTS

| | | |
|---|---|---|
| CN | 101932111 | 12/2010 |
| CN | 102013905 | 4/2011 |
| CN | 102244881 | 11/2011 |
| CN | 102448028 A | 5/2012 |
| CN | 102549997 A | 7/2012 |
| CN | 102647751 A | 8/2012 |
| CN | 102685864 A | 9/2012 |
| WO | WO-2012/110863 | 8/2012 |

OTHER PUBLICATIONS

International Search Report for PCT/CN2014/070890 dated Apr. 25, 2014.
Extended European Search Report for EP Application No. 14740974.2 dated Nov. 27, 2015.
Motorola Mobility: "CoMP schemes with backhaul constraints and the modeling discussion", 3GPP Draft; R1-110871, 3rd Generation Partnership Project (3GPP), Mobile Competence Centre ; 650, Route Des Lucioles ; F-06921 Sophia-Antipolis Cedex; France, vol. RAN WGI, No. Taipei, Taiwan; Feb. 21, 2011, Feb. 15, 2011 (Feb. 15, 2011), XP050490638, [retrieved on Feb. 15, 2011].
Huawei: "Inter-eNB and Intra-eNB Schemes for CoMP in LTE-Advanced", 3GPP Draft; R1-083050 Inter-ENB and Intra-ENB Schemes for Comp in LTE-Advanced-Final, 3rd Generation Partnership Project (3GPP), Mobile Competence Centre ; 650, Route Des Lucioles ; F-06921 Sophia-Antipolis Cedex , France, No. Jeju; Aug. 12, 2008, Aug. 12, 2008 (Aug. 12, 2008), XP050316496, [retrieved on Aug. 12, 2008].
KDDI: "Observations on CoMP schemes", 3GPP Draft; R1-113363 Comp, 3rd Generation Partnership Project (3GPP), Mobile Competence Centre ; 650, Route Des Lucioles ; F-06921 Sophia-Antipolis Cedex ; France, vol. RAN WGI, No. Zhuhai; Oct. 10, 2011, Oct. 4, 2011 (Oct. 4, 2011), XP050538426, [retrieved on Oct. 4, 2011].
NTT Docomo: "DL CoMP Scheme in Rel-11", 3GPP Draft; R1-113291 Rel 11 Comp Schemes, 3rd Generation Partnership Project (3GPP), Mobile Competence Centre ; 650, Route Des Lucioles ; F-06921 Sophia-Antipolis Cedex , France, vol. RAN WGI, No. Zhuhai; Oct. 10, 2011, Oct. 4, 2011 (Oct. 4, 2011), XP050538395, [retrieved on Oct. 4, 2011].
3GPP;TSG-RAN WG3 #75bis R3-120582 $201C Solution for the autonomous optimization of the operational carrier$201D DAC-UPC, Mar. 26-30, 2012, San Jose del Cabo, Mexico, (pp. 9).

* cited by examiner

METHOD, SYSTEM AND DEVICE FOR SCHEDULING RESOURCE

This application is a US National Stage of International Application No. PCT/CN2014/070890, filed on Jan. 20, 2014, designating the United States and claiming the benefit of Chinese Patent Application No. 201310021980.9, filed with the State Intellectual Property Office of People's Republic of China on Jan. 21, 2013 and entitled "Method, system and device for scheduling resource", the content of which is hereby incorporated by reference in its entirety.

FIELD

The present invention relates to the field of wireless communications and particularly to a method, system and device for scheduling a resource.

BACKGROUND

Coordinated Multi-Point (CoMP) transmission has been applied in a Long Term Evolution-Advance (LTE-A) system to thereby lower interference to a User Equipment (UE) at the edge of a coverage area of a small cell from an adjacent cell, so as to improve an experience of the UE at the edge of the cell. Coordinated Multi-Point (CoMP) transmission refers to cooperation among a plurality of Transmission Points (TPs) separate in geographical position. Typically the plurality of transmission points refer to eNBs of different cells, or an eNB of a cell and a plurality of Remote Radio Heads (RRHs) controlled by the eNB. CoMP transmission can be categorized into downlink coordinated transmission and uplink joint reception. Downlink coordinated multi-point transmission is generally further categorized into two transmission schemes: Coordinated Scheduling/Coordinated Beam-forming (CS/CB) and Joint Processing (JP). In the CS/CB scheme, one of the plurality of transmission points transmits a useful signal to the UE, and interference from the other transmission points to the UE is lowered as much as possible through joint scheduling and beam-forming. The joint processing scheme can be further categorized into schemes: Joint Transmission (JT) and Dynamic Point Selection (DPS). In the JT scheme, the plurality of transmission points transmit useful signals to the UE concurrently to thereby enhance the received signal of the UE. In the DPS scheme, the transmission point to the UE is switched dynamically by always selecting the optimum one for the UE among the cooperating transmission points to transmit a signal to the UE. These schemes of coordinated multi-point transmission can be applied in combination with each other or can be combined with Dynamic Blanking (DB) to dynamically disable some transmission points from transmitting signals over some time-frequency resources.

Downlink coordinated multi-point transmission is implemented based upon Channel State Information (CSI), obtained by the eNBs, of the UE to the respective cooperating points. The CSI includes a Channel Quality Indicator (CQI), a Pre-coding Matrix Indicator (PMI), a Rank Indicator (RI), etc. The UE measures channels of the respective eNBs to the UE using downlink reference signals transmitted by the eNBs, and feeds channel information measured by the UE to a serving cell of the UE. The serving cell of the UE receives the CSI and performs coordinated scheduling and/or coordinated pre-coding with the cooperating cells to thereby implement coordinated transmission.

Existing schemes of distributed coordinated scheduling can enable inter-cell coordinated scheduling and/or coordinated pre-coding scheduling, as illustrated in FIG. 1.

Distributed scheduling is performed respectively at the respective cooperating eNBs without exchanging a large amount of CSI via an X2 interface, so that the amount of information transmitted via the X2 interface may be less than in centralized scheduling, as illustrated in FIG. 2. However distributed scheduling can not optimize a global scheduling result according to scheduling conditions between the eNBs. In order to achieve a nearly globally-optimized result, iterative scheduling between the eNBs may need to be performed so that the cooperating eNBs may need to exchange the scheduling information with each other repeatedly if there is a significant delay via the X2 interface between the eNBs, then repeated exchanges of the scheduling information in distributed scheduling may come with such a high scheduling delay that the channel information may become outdated, thus degrading the transmission performance. Thus the scheme of CoMP distributed scheduling needs to be designed carefully in the scenario with a significant delay via the X2 interface to thereby minimize the number of times that the information is exchanged between the cooperating eNBs, to thereby lower the amount of exchanged information.

At present, distributed coordinated scheduling has to be performed iteratively by exchanging the scheduling information iteratively so that there may be a considerable increase in scheduling delay via the X2 interface with a significant delay.

SUMMARY

Embodiments of the invention provide a method, system and device for scheduling a resource so as to address such a problem in the prior art that distributed coordinated scheduling has to be performed iteratively by exchanging the scheduling information iteratively so that there may be a considerable increase in scheduling delay via the X2 interface with a significant delay.

An embodiment of the invention provides a method for scheduling a resource, the method including:

determining, by a serving base station, a time-frequency resource which needs to be blanked by a cooperating base station, according to channel information reported by a Coordinated Multi-Point (CoMP)-enabled User Equipment (UE), and notifying the cooperating base station of the time-frequency resource which needs to be blanked; and scheduling, by the serving base station, the UE according to received decision, from the cooperating base station, of whether to blank the resource.

An embodiment of the invention provides another method for scheduling a resource, the method including:

determining, by a cooperating base station, a time-frequency resource which needs to be blanked, according to received notification from a serving base station; and deciding, by the cooperating base station, whether to blank the time-frequency resource which needs to be blanked, and returning decision of whether to blank the resource to the serving base station so that the serving base station schedules a UE according to the received decision.

An embodiment of the invention provides a serving base station for scheduling a resource, the serving base station including:

a processing module configured to determine a time-frequency resource which needs to be blanked by a cooperating base station, according to channel information reported by a CoMP-enabled UE, and to notify the cooperating base station of the time-frequency resource which needs to be blanked; and a scheduling module configured for the serving base station to schedule the UE according to received decision, from the cooperating base station, whether to blank the resource.

An embodiment of the invention provides a cooperating base station for scheduling a resource, the cooperating base station including:

a determining module configured to determine a time-frequency resource which needs to be blanked, according to received notification from a serving base station; and a notification module configured to decide whether to blank the time-frequency resource which needs to be blanked, and to return decision whether to blank the resource to the serving base station so that the serving base station schedules a UE according to the received decision.

An embodiment of the invention provides a system for scheduling a resource, the method including:

a serving base station configured to determine a time-frequency resource which needs to be blanked by a cooperating base station, according to channel information reported by a. CoMP-enabled UE, and to notify the cooperating base station of the time-frequency resource which needs to be blanked; and to schedule the UE according to received decision, from the cooperating base station, of whether to blank the resource; and the cooperating base station configured to determine the time-frequency resource which needs to be blanked, according to the notification from the serving base station; and to decide whether to blank the resource which needs to be blanked, and to return to the serving base station the decision whether to blank the resource.

An embodiment of the invention provides a serving base station for scheduling a resource, the serving base station including:

a processor module configured to determine a time-frequency resource which needs to be blanked by a cooperating base station, according to channel information reported by a COMP-enabled UP, and to schedule the UE according to received decision, from the cooperating base station, whether to blank the resource; and a transceiver module configured to notify the cooperating base station of the time-frequency resource which needs to be blanked, and to receive the decision, from the cooperating base station, of whether to blank the resource.

An embodiment of the invention provides a cooperating base station for scheduling a resource, the cooperating base station including:

a processor module configured to determine a time-frequency resource which needs to be blanked, according to received notification from a serving base station, and to determine whether to blank the time-frequency resource which needs to be blanked; and a transceiver module configured to receive the notification from the serving base station, and to return decision whether to blank the resource to the serving base station so that the serving base station schedules a UE according to the received decision.

In the embodiments of the invention, the serving base station determines time-frequency resource which needs to be blanked by the cooperating eNB, according to the channel information reported by the CoMP-enabled UP, and notifies the cooperating eNB of the time-frequency resource which needs to be blanked; and schedules the UP according to the received decision, from the cooperating eNB, of whether to blank the resource. Dynamic blanking can be enabled for the cooperating cell, after the eNB receives the CSI feedback information of the UE and schedules the UE, by exchanging the scheduling information only twice instead of exchanging the scheduling information iteratively, to thereby lower a scheduling delay when there is a significant delay via an X2 interface so as to improve the efficiency of the scheduling information and the performance of the system.

DETAILED DESCRIPTION OF THE EMBODIMENTS

In the embodiments of the invention, a serving eNB determines a time-frequency resource which needs to be blanked by a cooperating eNB, according to channel information reported by a CoMP-enabled UE, and notifies the cooperating eNB of the time-frequency resource which needs to be blanked; and schedules the UE according to received decision, from the cooperating eNB, whether to blank the resource. Dynamic blanking can be enabled for a cooperating cell, after the eNB receives CSI feedback information of the UE and schedules the UE, by exchanging scheduling information only twice instead of exchanging the scheduling information iteratively, to thereby lower a scheduling delay when there is a significant delay via an X2 interface so as to improve the efficiency of the scheduling information and the performance of the system.

The embodiments of the invention will be described below in further details with reference to the drawings.

In the following description, firstly an implementation with cooperation of the serving eNB and the cooperating eNB will be described, and then implementation at the serving eNB and implementation at the cooperating eNB will be described respectively, but this will not suggest required cooperation of both the eNBs for an implementation, and in fact, problems encountered respectively at the serving eNB and the cooperating eNB will also be addressed in the separate implementations at serving eNB side and the cooperating eNB side, although a better technical effect can be achieved in the implementation with cooperation of both eNBs.

Figure 1:
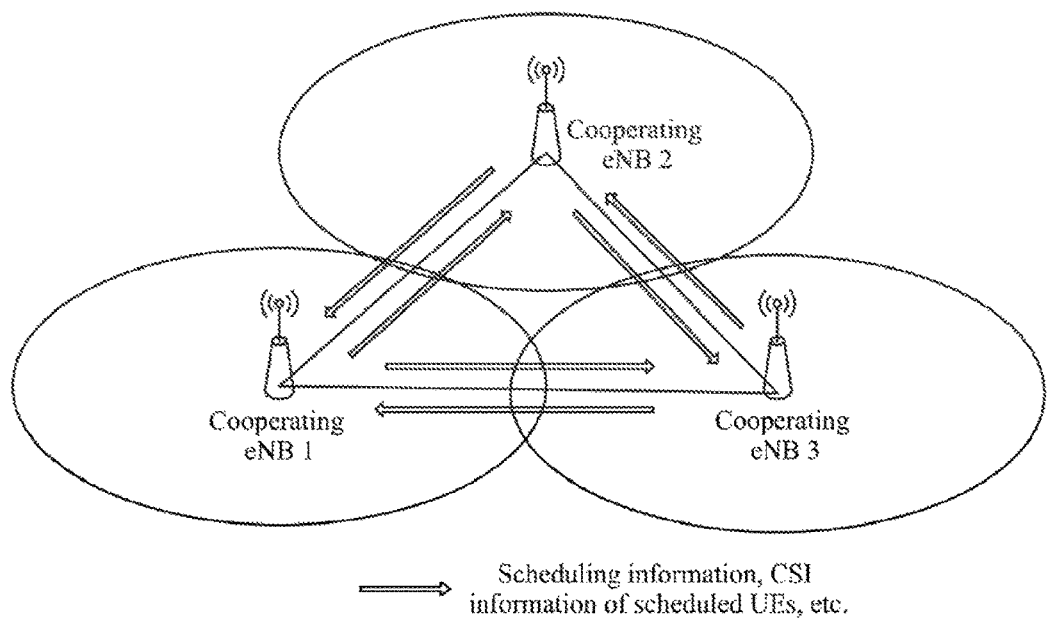
FIG. 1 illustrates a schematic diagram of information being exchanged in distributed scheduling in the prior art.
Figure 2:
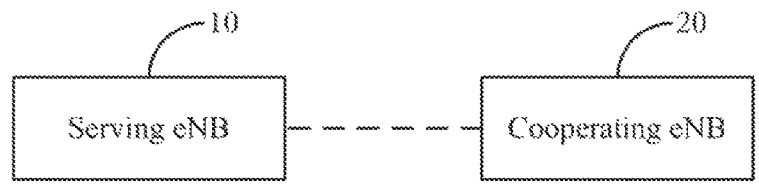
FIG. 2 illustrates a schematic structural diagram of a system for scheduling a resource according to an embodiment of the invention.

As illustrated in FIG. 2, a system for scheduling a resource according to an embodiment of the invention includes a serving eNB 10 and a cooperating eNB 20.

The serving eNB 10 is configured to determine a time-frequency resource, which needs to be blanked by the cooperating eNB, according to channel information reported by a CoMP-enabled UE, and to notify the cooperating eNB of the time-frequency resource which needs to be blanked; and to schedule the UE according to received decision, from the cooperating eNB, of whether to blank the resource; and The cooperating eNB 20 is configured to determine the time-frequency resource which needs to be blanked, according to the notification from the serving eNB 10; and to decide whether to blank the determined time-frequency resource, and to return to the serving eNB 10 the decision of whether to be blank the resource, so that the serving eNB schedules the UE according to the received decision.

Here the CoMP-enabled UE and/or a non-COMP-enabled UE may be scheduled according to the received decision.

For example, if the cooperating eNB returns a decision to blank the time-frequency resource, then the serving eNB determines that there will be no interference of the cooperating eNB to the COMP-enabled UE, and performs scheduling according to the CSI reported by the CoMP-enabled UE assuming no interference thereto of the cooperating eNB, and CSI reported by the non-CoMP-enabled UE; and if the cooperating eNB returns a decision not to blank the time-frequency resource, then the serving eNB determines that there will be interference of the cooperating eNB to the CoMP-enabled UE, and performs scheduling according to the CSI reported by the CoMP-enabled UE assuming interference thereto of the cooperating eNB, and the CSI reported by the non-COMP-enabled UE.

In an implementation, the respective eNBs can be configured respectively by a higher layer of a network to or not to be capable of dynamic blanking in such a way that the network configures an eNB capable of dynamic blanking to decide whether to accept a blanking request, according to a condition of the present eNB, and to broadcast, to nearby eNBs, notification whether the blanking request is accepted.

The network configures the eNB capable of dynamic blanking to decide whether to accept the blanking request, according to a traffic condition, a channel condition, etc., of the present eNB.

Preferably the serving eNB signals the time-frequency resource which needs to be blanked, only to a cooperating eNB capable of dynamic blanking.

Here the serving eNB can determine whether the cooperating eNB is an eNB capable of dynamic blanking, according to configuration by a higher layer; or can determine whether the cooperating eNB is an eNB capable of dynamic blanking, according to notification transmitted by the cooperating eNB.

A result of last determination whether the cooperating eNB is an eNB capable of dynamic blanking will apply after the cooperating eNB is determined as an eNB capable of dynamic blanking, until new notification, transmitted by the cooperating eNB, whether it is an eNB capable of dynamic blanking, or new configuration by the higher layer is received.

There may be a number of approaches in which the time-frequency resource is scheduled according to the embodiment of the invention, and which will be described below respectively.

First approach, the serving eNB determines the time-frequency resource which needs to be blanked by the cooperating eNB, according to CSI of the serving eNB reported by the CoMP-enabled UE.

For a time-frequency resource which can be scheduled to the CoMP-enabled UE to transmit a Physical Downlink Shared Channel (PDSCH) signal, the serving eNB performs pre-scheduling over the time-frequency resource according to the CSI of the serving eNB reported by the CoMP-enabled UE assuming that the time-frequency resource is blanked by the cooperating eNB, and CSI of the serving eNB reported by the non-CoMP-enabled UE; and performs pre-scheduling over the time-frequency resource according to the CSI of the serving eNB reported by the CoMP-enabled UE assuming that the time-frequency resource is not blanked by the cooperating eNB, and the CSI of the serving eNB reported by the non-CoMP-enabled UE; and The serving eNB selects a time-frequency resource over which the CoMP-enabled UE is pre-scheduled, from all the time-frequency resources over which pre-scheduling is performed, as the time-frequency resource over which the cooperating eNB needs to be blanked.

Here the serving eNB performs pre-scheduling twice, and determines a corresponding time-frequency resource as a time-frequency resource which needs to be blanked by the cooperating eNB as long as the CoMP-enabled UE is pre-scheduled once.

The serving eNB receives the CSI of the serving eNB reported by the served UE, and decides whether to request the cooperating eNB for blanking, according to the reported CSI of the serving eNB.

Firstly the serving eNB configures the CoMP-enabled UE to report CSI, which includes: CSI not blanked assuming that the serving eNB is a transmission point, and the cooperating eNB is an interference point; and CSI is blanked by the cooperating eNB assuming that the serving eNB is a transmission point. The CoMP-enabled UE refers to a UE to which more than one eNB cooperates in transmitting; and Then the CoMP-enabled UE measures and reports CSI according to the configuration by the serving eNB, and here the CSI of the serving eNB reported by the CoMP-enabled UE includes CSI when the time-frequency resource is blanked by the cooperating eNB, and CSI when the time-frequency resource is not blanked by the cooperating eNB; and The serving eNB pre-schedules the UE over all the time-frequency resources for scheduling according to the CSI, when the cooperating eNB blanks the resource and when the cooperating eNB doesn't blank the resource, reported by the UE, and the CSI of the serving eNB reported by the non-CoMP-enabled UE, and determines the time-frequency resource which needs to be blanked by the cooperating eNB, according to a result of scheduling.

The serving eNB can pre-schedule the UE over any one time-frequency resource assuming that the cooperating eNB performs blanking and that the cooperating eNB doesn't perform blanking, particularly as follows:

1. The serving eNB assumes that the time-frequency resource is blanked by the cooperating eNB, the serving eNB schedules the UE over the time-frequency resource according to the CSI reported by the CoMP-enabled UE of the serving eNB assuming that the resource is blanked by the cooperating eNB, and the CSI reported by the non-CoMP-enabled UE; and 2. The serving eNB assumes that the time-frequency resource is not blanked by the cooperating eNB, the serving eNB schedules the UE over the time-frequency resource according to the CSI reported by the CoMP UE of the serving eNB assuming that the cooperating eNB is an interference point and not blanked, and the CSI reported by the non-CoMP UE.

In an implementation, the two kinds of pre-scheduling above are involved in one scheduling operation of the serving eNB and performed separately.

The serving eNB determines the time-frequency resource which needs to be blanked by the cooperating eNB, according to results of scheduling on the two assumption above as follows: the serving eNB searches for results of the two kinds of scheduling for all the time-frequency resources over which pre-scheduling is performed, and if the COMP-enabled UE is scheduled in either or both of the two kinds of scheduling over a time-frequency resource, then the serving eNB decides to request the cooperating eNB for blanking the time-frequency resource.

That is, the serving eNB selects a time-frequency resource over which the CoMP-enabled UE is pre-scheduled, from all the time-frequency resources over which pre-scheduling is performed, as the time-frequency resource which needs to be blanked by the cooperating eNB.

The serving eNB signals the time-frequency resource which needs to be blanked, to the cooperating eNB by transmitting an indicator of the time-frequency resource which needs to be blanked, and scheduling information for pre-scheduling over the time-frequency resource to the cooperating eNB. For example, the serving eNB can put the indicator of the time-frequency resource which needs to be blanked, and the scheduling information for pre-scheduling over the time-frequency resource into the blanking request transmitted to the cooperating eNB. The serving eNB transmits all the generated blanking requests to the cooperating eNB.

Particularly the serving eNB generates the blanking request for the time-frequency resource which the serving eNB decides to request the cooperating for blanking as follows:

The blanking request includes the indicator of the time-frequency resource which needs to be blanked, and the scheduling information for the two kinds of scheduling above over the time-frequency resource. Here the indicator of each time-frequency can be a resource index, or a resource-bitmap, which can be sorted as prescribed between the serving eNB and the cooperating eNB or specified in a protocol, and the scheduling information over the time-frequency resource can include the parameter value representing a quality of transmission in pre-scheduling by the serving eNB over the time-frequency resource, or the parameter value representing a difference in quality of transmission in pre-scheduling by the serving eNB over the time-frequency resource (i.e., one or more indexes of difference between the parameter values of the quality of transmission). Here the index of difference between the parameter values of the quality of transmission shall represent the difference between the parameter values of the quality of transmission for the two kinds of scheduling by the serving eNB over the resource, e.g., RI and CQI information of the UE scheduled in the two kinds of scheduling and/or transport block sizes (or throughputs) of the UE scheduled in the two kinds of scheduling and/or the difference between the transport block sizes (or throughputs) in the two kinds of scheduling and/or another index to which the transport block sizes (or throughputs), or the difference between the transport block sizes (or throughputs), of the UE scheduled in the two kinds of scheduling is mapped, where the mapping between the transport block sizes (or throughputs), or the difference between the transport block sizes (or throughputs), and the other index is pre-defined, or is prescribed between the serving eNB and the cooperating eNB, or is specified in the protocol.

The cooperating eNB receives all the blanking requests transmitted by the serving eNB, and decides for each scheduling resource, for which the blanking request is transmitted, whether to blank the time-frequency resource.

For a time-frequency resource which needs to be blanked, after the cooperating eNB determines the time-frequency resource as a time-frequency resource which can be blanked, the cooperating eNB determines the parameter value of a quality of transmission of the cooperating eNB when the time-frequency resource is not blanked by the cooperating eNB, and determines the parameter values of the quality of transmission of the serving eNB respectively when the time-frequency resource is blanked and not blanked by the cooperating eNB, or determines the difference between the parameter values of the quality of transmission of the serving eNB respectively when the time-frequency resource is blanked and not blanked by the cooperating eNB.

The cooperating eNB decides whether to blank the time-frequency resource which needs to be blanked, according to the determined parameter value of the quality of transmission of the cooperating eNB, and the determined parameter values of the quality of transmission of the serving eNB or difference between the parameter values of the quality of transmission.

Here if the cooperating eNB doesn't performs blanking for the time-frequency resource, then the present eNB calculates the parameter value of the quality of transmission of the cooperating eNB assuming that the cooperating eNB doesn't performs blanking, according to scheduling information of the cooperating eNB over the time-frequency resource; and determines the sums of the parameter values of the quality of transmission of the serving eNB and the cooperating eNB over the time-frequency resource assuming that the cooperating eNB performs blanking and assuming that the cooperating eNB doesn't perform blanking respectively according to the one or more indexes of difference between the parameter values of the quality of transmission, and the parameter value of the quality of transmission of the cooperating eNB over the time-frequency resource assuming that the cooperating eNB doesn't perform blanking, in the received blanking request of the time-frequency resource; or calculates the difference between the two sums above of the parameter values of the quality of transmission directly, and decides whether to enable blanking at the present cooperating eNB, according to the difference between the sums of the parameter values of the quality of transmission on the two assumptions.

Preferably if the transmission performance of the serving eNB when the time-frequency resource is blanked by the cooperating eNB is determined to be no lower than the total transmission performance of the cooperating eNB and the serving eNB when the time-frequency resource is not blanked by the cooperating eNB, according to the parameter value of the quality of transmission of the cooperating eNB when the time-frequency resource is not blanked by the cooperating eNB, and the parameter values of the quality of transmission of the serving eNB respectively when the time-frequency resource is blanked and not blanked by the cooperating eNB, then the cooperating eNB decides to blank the time-frequency resource which needs to be blanked; otherwise, the cooperating eNB decides not to blank the time-frequency resource which needs to be blanked; or If the transmission performance of the serving eNB when the time-frequency resource is blanked by the cooperating eNB is determined to be no lower than the total transmission performance of the cooperating eNB and the serving eNB when the time-frequency resource is not blanked by the cooperating eNB, according to the parameter value of the quality of transmission of the cooperating eNB when the time-frequency resource is not blanked by the cooperating eNB, and the difference between the parameter values of the quality of transmission of the serving eNB respectively when the time-frequency resource is blanked and not blanked by the cooperating eNB, then the cooperating eNB decides to blank the time-frequency resource which needs to be blanked; otherwise, the cooperating eNB decides not to blank the time-frequency resource which needs to be blanked.

For example, if the parameter value of the quality of transmission of the serving eNB when the time-frequency resource is blanked by the cooperating eNB is no less than the sum of the parameter value of the quality of transmission of the cooperating eNB and the parameter value of the quality of transmission of the serving eNB when the time-frequency resource is not blanked by the cooperating eNB, so that the transmission performance of the serving eNB when the time-frequency resource is blanked by the cooperating eNB is determined to be no lower than the total transmission performance of the cooperating eNB and the serving eNB when the time-frequency resource is not blanked by the cooperating eNB, then the cooperating eNB decides to blank the time-frequency resource which needs to be blanked; otherwise, the cooperating eNB decides not to blank the time-frequency resource which needs to be blanked; or If the sum of the parameter value of the quality of transmission of the cooperating eNB when the time-frequency resource is not blanked, and the difference between the parameter values of the quality of transmission is no less than 0, so that the transmission performance of the serving eNB when the time-frequency resource is blanked is determined to be no lower than the total transmission performance of the cooperating eNB and the serving eNB when the time-frequency resource is not blanked by the cooperating eNB, then the cooperating eNB decides to blank the time-frequency resource which needs to be blanked; otherwise, the cooperating eNB decides not to blank the time-frequency resource which needs to be blanked.

The cooperating eNB transmits the blanking decisions on the respective time-frequency resources on which any other eNBs request for blanking, to the respective eNBs transmitting the blanking requests to the cooperating eNB. The cooperating eNB can transmit indicators of the blanking decisions of the respective time-frequency resources to the serving eNB by directly notifying the indexes or a bitmap of the resources for blanking or the other resources than the resources for blanking. For example, with the bitmap of the resources, the cooperating eNB flags a bit corresponding to a time-frequency resource which is decided to be blanked, to 1, and a bit corresponding to a time-frequency resource which is decided not to be blanked, or a time-frequency resource for which no blanking decision is made to 0, and the cooperating eNB transmits the bit map to the serving eNB, and blanks the time-frequency resources flagged to 1.

Correspondingly the serving eNB receives the indicator of the blanking decision from the cooperating eNB, and re-schedules according to the blanking condition indicated by the cooperating eNB.

The serving eNB can re-schedule according to the blanking condition of the cooperating eNB in such way that the serving eNB re-schedule over the time-frequency resource, which is indicated to be blanked by the cooperating eNB through the blanking decision, according to the cooperating eNB blanking; and re-scheduling over the time-frequency resource, which is indicated not to be blanked by the cooperating eNB through the blanking decision, or for which no blanking decision is made, according to the cooperating eNB not blanking.

For example, the serving eNB schedules over the time-frequency resource which is blanked by the cooperating eNB, according to the CSI reported by the CoMP-enabled UE, assuming no interference of the cooperating eNB, and the CSI reported by the non-CoMP-enabled UE; and the serving eNB schedules over the time-frequency resource which is not blanked by the cooperating eNB, according to the CSI reported by the CoMP-enabled UE assuming interference of the cooperating eNB, and the CSI reported by the non-CoMP-enabled UE.

Figure 3A:
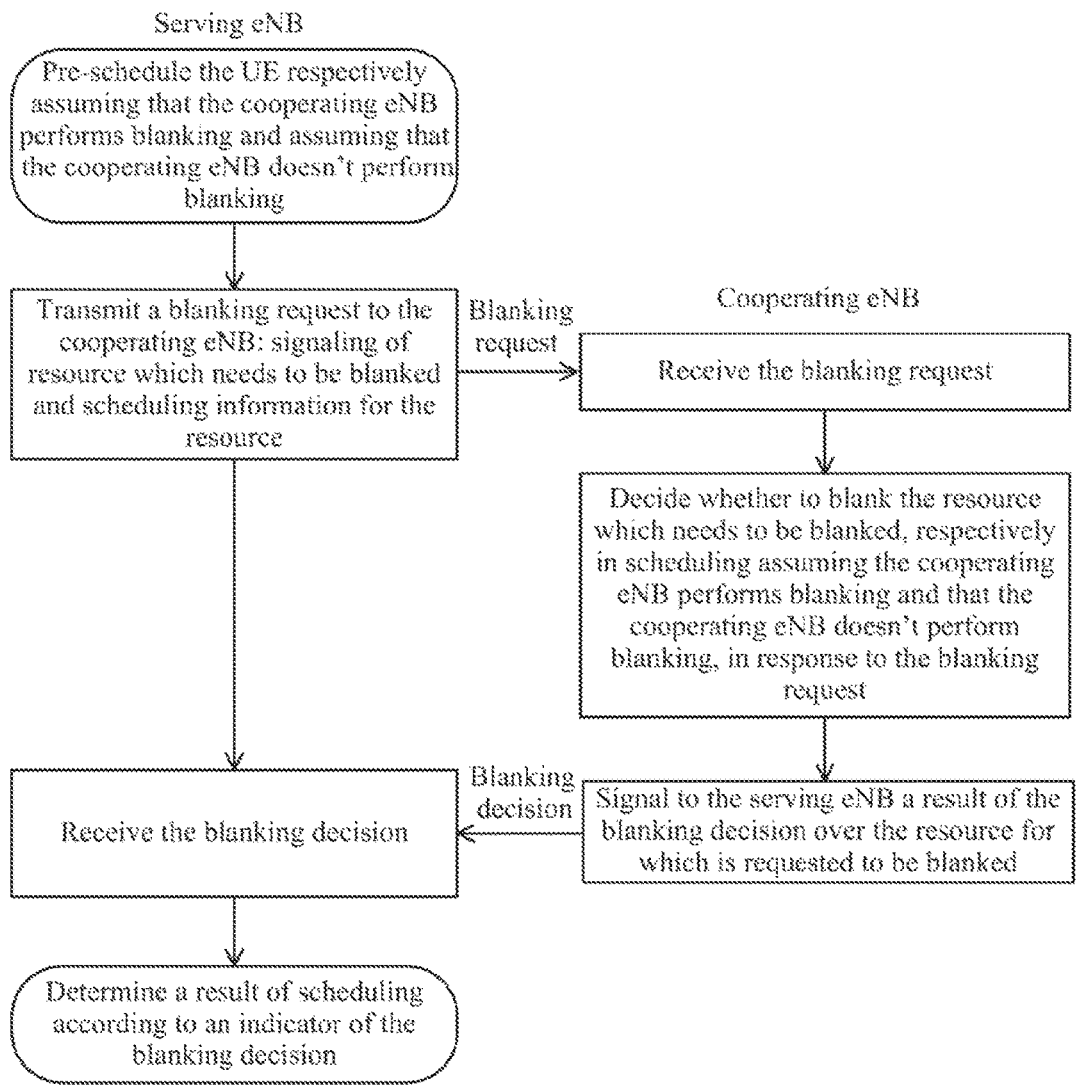
FIG. 3A illustrates a first schematic diagram of information being exchanged between a serving eNB and a cooperating eNB in distributed dynamic blanking according to an embodiment of the invention.
Figure 3B:
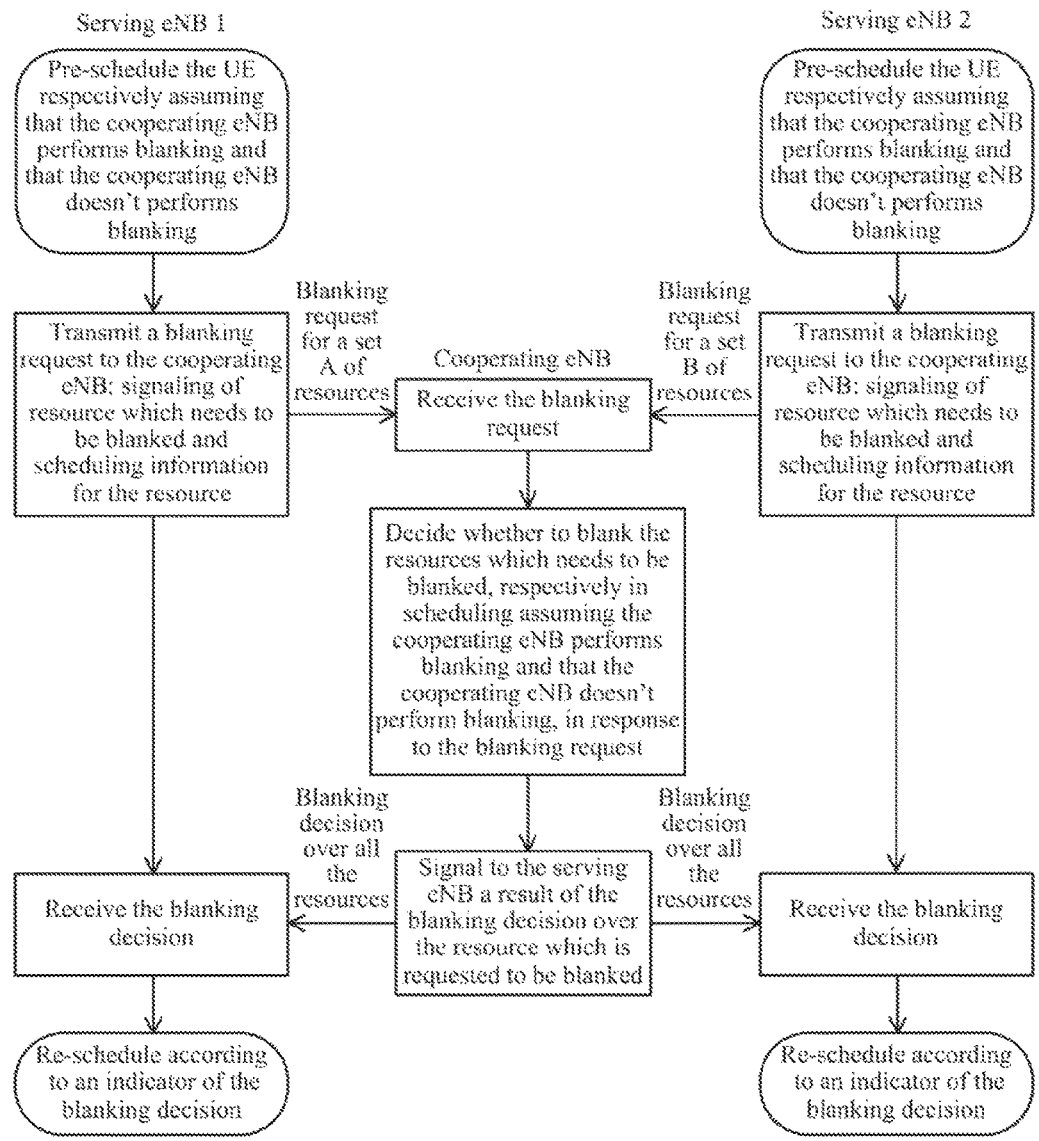
FIG. 3B illustrates a schematic diagram of information being exchanged between two serving eNBs and a cooperating eNB in distributed dynamic blanking according to an embodiment of the invention.

FIG. 3A illustrates an example of a flow of exchanging information between a serving eNB and a cooperating eNB in distributed dynamic blanking above in the first approach. FIG. 3B illustrates an example of a flow of exchanging information between two serving eNBs and a cooperating eNB in distributed dynamic blanking above in the first approach.

In the method above of exchanging information in distributed dynamic blanking, neither information will be exchanged nor the UE will be scheduled iteratively after the eNB receives the report of the UE and schedules the UE, but the process above will only be performed before the UE is scheduled each time.

In a second approach, the serving eNB determines the time-frequency resource which needs to be blanked by the cooperating eNB, according to measurement report information reported by the CoMP-enabled UE.

Particularly for a time-frequency resource which can be scheduled to the CoMP-enabled UE to transmit a Physical Downlink Shared Channel (PDSCH) signal, the serving eNB determines the time-frequency resource as the time-frequency resource over which the cooperating eNB needs to be blanked, after the measurement report information reported by the CoMP-enabled UE satisfies an interference condition.

Here if the measurement report information satisfies the interference condition, then it is determined that the cooperating eNB generates strong interference to transmission of the CoMP-enabled UE over the time-frequency resource and the quality of transmission of the CoMP-enabled UE can be improved by eliminating the strong interference of the cooperating eNB to transmission of the CoMP-enabled UE over the time-frequency resource.

Whether the measurement report information satisfies the interference condition can be determined in a number of ways, for example, a first threshold and a second threshold can be preset, measurement report information indicating interference among the measurement report information reported by the CoMP-enabled UE can be compared with the first threshold, strong interference of the cooperating eNB to transmission of the CoMP-enabled UE over the time-frequency resource can be determined from a result of comparison, measurement report information indicating no interference among the measurement report information reported by the CoMP-enabled UE can be compared with the second threshold, and it can be determined from a result of comparison that the quality of transmission of the CoMP-enabled UE can be improved by eliminating the strong interference of the cooperating eNB to transmission of the CoMP-enabled UE over the time-frequency resource, and then it can be determined that the measurement report information satisfies the interference condition.

For example, the serving eNB receives a CSI feedback corresponding to the time-frequency resource reported by the CoMP-enabled UE served by the serving eNB, where the CSI feedback includes a CQI of the serving eNB assuming that there is interference of the cooperating eNB CQI1 hereinafter), and a CQI of the serving eNB assuming that there is no interference of the cooperating eNB (a CQI2 hereinafter); and the serving eNB compares the CQI1 with the first threshold, and if the CQI1 is less than the first threshold, then the serving eNB determines that there is strong interference of the cooperating eNB to transmission of the COMP-enabled UE over the time-frequency resource; and compares the CQI2 with the second threshold, and if the CQI2 is more than the second threshold, then the serving eNB determines that, the quality of transmission of the CoMP-enabled UE can be improved by eliminating the strong interference of the cooperating eNB to transmission of the CoMP-enabled UE over the time-frequency resource.

The first threshold and the second threshold can be specific CQI values or can be other values capable of indicating a quality of transmission. Preferably if the serving eNB further receives the CQI of the serving eNB reported by the other non-CoMP-enabled UE, then the serving eNB searches for and takes the largest CQI value as the second threshold.

The serving eNB receives measurement report information reported by the UE served by the serving eNB, and selects the time-frequency resource which needs to be blanked by the cooperating eNB, according to the measurement report information.

The measurement report information, of the UE served by the serving eNB, received by the serving eNB can include but will not be limited to a part or all of the following information:

A Reference Signal Received Power (RSRP)/Reference Signal Received Quality (RSRQ) measurement report of a channel of the serving eNB to the UE; an RSRP/RSRQ measurement report of a channel of the cooperating eNB to the UE; broadband and/or sub-band CQI information of the channel of the serving eNB to the UE; broadband and/or sub-band CQI information of the channel of the cooperating eNB to the UE; and Sounding Reference Signal (SRS) information.

Preferably the serving eNB can determine the time-frequency resource which needs to be blanked by the cooperating eNB, according to the measurement report information as follows:

The serving eNB traverses time-frequency resources which may be scheduled in scheduling to the UE to transmit a PDSCH signal, where for each time-frequency resource, the serving eNB traverses sequentially UEs with the serving eNB and the cooperating eNB in each measurement set (the measurement set is determined by the network from measurement reports of the UEs), where for each UE with the serving eNB and the cooperating eNB in the measurement set, the serving eNB compares the measurement report information with different given threshold, or compares the report information between the different UEs, and determines whether the cooperating eNB generates significant interference to the UE over the time-frequency resource, and whether there is good performance of transmission by the UE over the resource if there is no interference of the cooperating eNB.

If the serving eNB determines that the UE is significantly subjected to interference of the cooperating eNB over the resource and there is good performance of transmission by the UE over the resource if there is no interference of the cooperating eNB, then the serving eNB decides that the time-frequency resource needs to be blanked by the cooperating eNB, and at this time, if there is no remaining UE which has not been traversed over the time-frequency resource, then the serving eNB may not further traverse; otherwise, the serving eNB continues with traversing UEs served by the serving eNB and the cooperating eNB in the other measurement sets.

If all the UEs served by the serving eNB and the cooperating eNB in all the measurement sets over the time-frequency resource have been traversed, and the serving eNB has not decided that the time-frequency resource needs to be blanked by the cooperating eNB, then the serving eNB decides that the time-frequency resource doesn't need to be blanked by the cooperating eNB.

The serving eNB decides whether the time-frequency resource needs to be blanked by the cooperating eNB, according to the measurement report information which can include the CQI, RSRP/RSRQ and other information lastly reported by the UE or can be the average of the CQI and other information of the serving eNB reported by the UE for a number of times.

The threshold against which the serving eNB determines whether the cooperating eNB generates significant interference, and the threshold against which the serving eNB determines whether there is good performance of transmission by the UE over the time-frequency resource if there is no interference of the cooperating eNB can be determined respectively from the average of interference and channel conditions of all the UEs served by the serving UE or can be determined as a result of simulation.

The serving eNB transmits the indicator of the time-frequency resource which needs to be blanked to the cooperating eNB after determining the time-frequency resource which needs to be blanked.

Preferably the serving eNB further transmits to the cooperating eNB a parameter representing a difference in transmission performance respectively when the time-frequency resource is blanked and not blanked by the cooperating eNB.

Particularly, the serving eNB puts au indicator of the time-frequency resource which needs to be blanked, into the blanking request transmitted to the cooperating eNB.

The serving eNB can notify the cooperating eNB of the resource for which blanking is requested in the form of a resource index, or a resource-bitmap, the resource index or the sequency of the resource in the resource-bitmap can be prescribed between the serving eNB and the cooperating eNB or specified in a protocol.

The blanking request transmitted by the serving eNB can further include an index representing a difference in transmission performance when the resource is blanked by the cooperating eNB and when the resource is not blanked by the cooperating eNB for which the serving eNB signals the blanking request, e.g., the difference between the averages of CQIs and/or transport block sizes assuming that the cooperating eNB performs blanking and that the cooperating eNB doesn't perform blanking.

The cooperating eNB receives all the blanking requests transmitted by the serving eNB, and decides for each scheduling resource for which the blanking request is transmitted, whether to enable blanking over the time-frequency resource.

Preferably the cooperating eNB determines N time-frequency resources with the lowest qualities of channel from time-frequency resources which can be blanked, where N represents a positive integer, and N can be determined as needed, as a result of simulation, etc.

If the time-frequency resource which needs to be blanked is included among the determined N time-frequency resources with the lowest qualities of channel, then blanking is decided for the time-frequency resource which needs to be blanked; otherwise, no blanking is decided for the time-frequency resource which needs to be blanked.

The cooperating eNB can make a blanking decision for a time-frequency resource which the serving eNB requests to be blanked as follows but without any limitation thereto:

The cooperating eNB firstly determines time-frequency resources which is not allowed to be blanked in a set of resources, where these time-frequency resources includes resources over which necessary reference signals, system broadcast signals, synchronization signals, etc., are transmitted.

The cooperating eNB sorts the other time-frequency resources which can be blanked in the set of resources in an order of average channel conditions of all the UEs served by the cooperating eNB. The cooperating eNB determines the average channel conditions of the UEs served by the cooperating eNB according to channel information, reported by the UEs served by the cooperating eNB, which can include CQI reports and/or RSRP/SRQ reports.

The cooperating eNB determines the number of time-frequency resources which can be allowed to be blanked as N according to a traffic load state of the cooperating eNB, and selects N sorted resources with the lowest average channel conditions as time-frequency resources for which blanking may be enabled.

The cooperating eNB determines time-frequency resources which the serving eNB requests to be blanked among the N time-frequency resources for which blanking may be enabled, as the blanked time-frequency resources.

The cooperating eNB transmits a blanking grant to the serving eNB, and the serving eNB receives and records the blanking grant of the cooperating eNB. The cooperating eNB transmits the blanking grant to the serving eNB as follows:

The cooperating eNB signals the time-frequency resources determined as the blanked time-frequency resources to the serving eNB.

The cooperating eNB can signal the blanked time-frequency resources to the serving eNB in the form of resource indexes or a bitmap. For example, the cooperating eNB flags bits in the bitmap corresponding to the time-frequency resources determined as the blanked time-frequency resources to 1, and bits corresponding to the time-frequency resources determined as the not-blanked time-frequency resources and the time-frequency resources for which the serving eNB does not transmit any blanking request to 0.

Correspondingly the cooperating eNB schedules the UE over a time-frequency resource flagged with "Blanked" assuming that the resource is blanked by the cooperating eNB, until new blanking resource decision of the cooperating eNB is received.

The serving eNB schedules the eNB according to lastly received decision, from the cooperating eNB, whether to blank the resource before new notification, from the cooperating eNB, whether to blank the resource is received.

In the second approach, the resource over which the cooperating eNB is blanked can be determined semi-statically relative to scheduling by the serving eNB and without making this decision before the UE is scheduled each time. The blanking grant of obtained in the second approach can apply for a period of time until new notification of a resource over which the cooperating eNB is blanked is obtained next time between the eNBs in the second approach.

That is, the serving eNB may not schedule the UE upon reception of notification of the blanked resource, but instead will schedule the UE according to lastly received notification of the blanked resource, when the UE needs to be scheduled.

For example, the blanking grant of the cooperating eNB can last for ten minutes, and the serving eNB will signal the time-frequency resource which needs to be blanked to the cooperating eNB, and receive notification of the cooperating eNB whether to blank the resource, every ten minutes. If the serving eNB receives the notification at time 1:00, then the serving eNB will schedule the UE each time in subsequent ten minutes according to the notification received at time 1:00.

Figure 4:
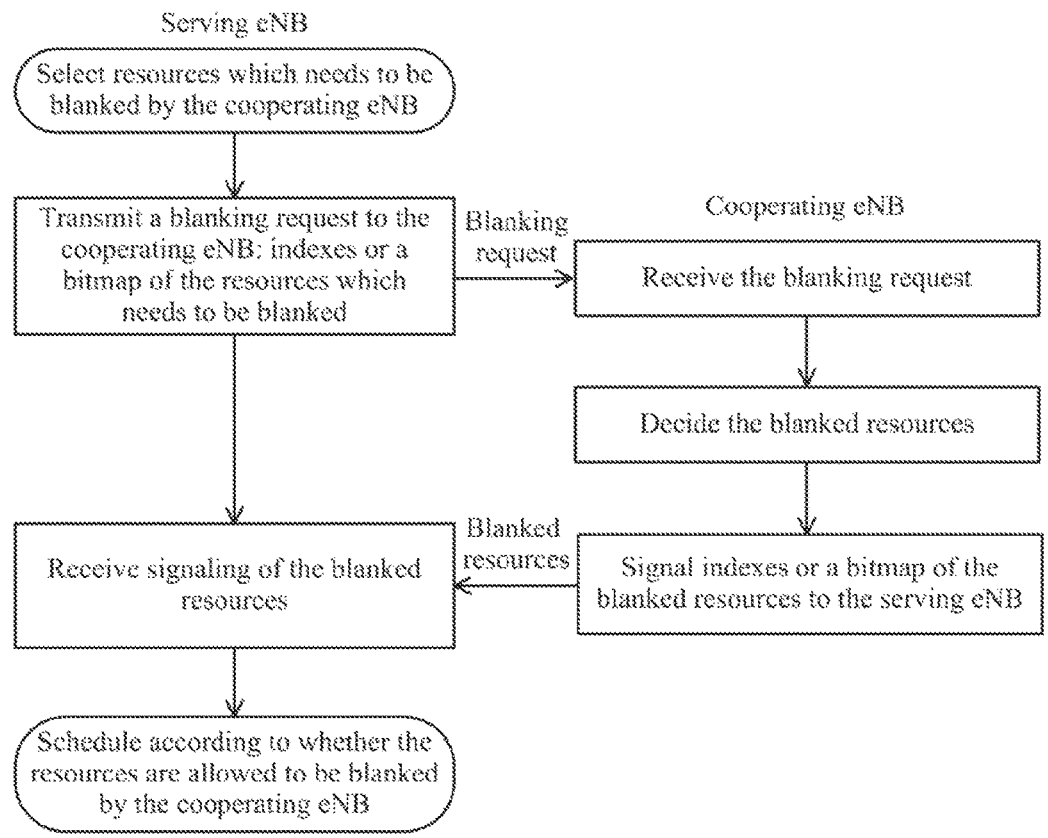
FIG. 4 illustrates a second schematic diagram of information being exchanged between a serving eNB and a cooperating eNB in distributed dynamic blanking according to an embodiment of the invention.

FIG. 4 illustrates an example of a flow of exchanging information between a serving eNB and a cooperating eNB in the second approach in distributed dynamic blanking with a lower delay in the exchange.

In the method above of exchanging information in distributed dynamic blanking with a lower delay in the exchange, before the serving eNB receives the CSI report of the UE and schedules the UE, the resource over which blanking is enabled can be determined by exchanging the information between the eNBs, without any additional increase in delay of scheduling, which may be more appropriate for a scenario with a significant delay via an X2 interface. The network side can apply the exchanging method in either of the first approach and the second approach as appropriate to a delay condition via the X2 interface.

A particular example of the first approach will be given below:

It is assumed that there are two eNBs in the system: an eNB 1 (a serving eNB) and an eNB 2 (a cooperating eNB), both of which cooperate in dynamic blanking;

There are two scheduling resources for the two eNBs above: a scheduling resource 1 and a scheduling resource 2; and There are two UEs served by the eNB 1, both of which may be scheduled over these two scheduling resources: a UE 1 and a UE 2, where the UE 1 is a CoMP-enabled UE, and the UE 2 is a non-CoMP-enabled UE.

At this time the network exchanges information in distributed dynamic blanking as follows.

The eNB schedules the UEs over the scheduling resource 1 respectively when the eNB 2 performs blanking and not perform blanking, where, for example, the UE 1 is scheduled when the eNB 2 perform blanking, and the UE 2 is scheduled when the eNB 2 doesn't perform blanking, over the scheduling resource 1; and alike the eNB 2 schedules the UE2 over the scheduling resource 2, where, for example, the UE 2 is scheduled when the eNB 2 performs blanking, and the UE 2 is scheduled when the eNB 2 doesn't perform blanking, over the scheduling resource 2.

TABLE 1

Result of pre-scheduling by the eNB 1

| | Scheduling resources | |
|---|---|---|
| | Scheduling resource 1 | Scheduling resource 2 |
| Assumed interference | Interference from eNB 2 | No interference from eNB 2 | Interference from eNB 2 | No interference from eNB 2 |
| Pre-scheduled UEs | UE 2 | UE 1 | UE 2 | UE 1 |

Since the eNB 1 schedules the CoMP UE, i.e., the UE 1, assuming there is no interference from the eNB 2 over both the scheduling resource 1 and the scheduling resource 2, the eNB 1 transmits a request for blanking the scheduling resource 1 and the scheduling resource 2 to the eNB 2, where the request includes a bitmap with both of bits corresponding to the resource 1 and the resource 2 being flagged to 1 and indexes representing a difference in transmission throughput assuming two interference conditions including there is no interference from the eNB 2 and there is interference from the eNB2 over the scheduling resource 1 and the scheduling resource 2 respectively.

In a first example of the index representing the difference in throughput:

RI and CQI measured by the UE 2 over the scheduling resource 1 assuming there is interference from the eNB 2: RI21 and CQI21;

RI and CQI measured by the UE 1 over the scheduling resource 1 assuming there is no interference from the eNB 2: an RI11 and a CQI11;

RI and CQI measured by the UE 2 over the scheduling resource 2 assuming there is interference from the eNB 2: an RI21 and a CQI21;

RI and CQI measured by the UE 1 over the scheduling resource 2 assuming there is no interference from the eNB 2: an RI21 and a CQI21.

In a second example of the index representing the difference in throughput:

Transport Block (TB) Size of the UE 2 over the scheduling resource 1 assuming there is interference from the eNB 2: TB21;

Transport Block (TB) Size of the UE 1 over the scheduling resource 1 assuming there is no interference from the eNB 2: TB11;

Transport Block (TB) Size of the UE 2 over the scheduling resource 2 assuming there is interference from the eNB 2: TB22; and Transport Block (TB) Size of the UE 1 over the scheduling resource 2 assuming there is no interference from the eNB 2: TB12.

In a third example of the index representing the difference in throughput:

The difference between the throughput, when the UE 1 is scheduled, over the scheduling resource 1 assuming there is no interference from the eNB 2, and the throughput, when the UE 2 is scheduled, over the scheduling resource 1 assuming there is interference from the eNB 2: $\alpha_1$; and The difference between the throughput when the UE 1 is scheduled assuming there is no interference from the eNB 2 over the scheduling resource 2, and the throughput when the UE 2 is scheduled assuming there is interference from the eNB 2: $\alpha_2$.

The eNB 2 receives the blanking request transmitted by the eNB 1, and decides whether the scheduling resource 1 and the scheduling resource 2 to be blanked respectively. The eNB 2 calculates the difference between the total throughputs of the UEs scheduled by the eNB 1 and the eNB 2 assuming the present eNB performs blanking and that the present eNB doesn't perform blanking (assumed that a UE 3 is scheduled when the eNB 2 doesn't perform blanking).

In a first example of the index representing the difference in throughput:

The total throughput when the eNB 2 performs blanking is calculated from the RI11 and the CQI11;

The total throughput w n the eNB 2 doesn't perform blanking is calculated from the RI21 and the CQI2, and scheduling information of the UE 3; and The difference between the total throughputs of the two assumptions are calculated.

In a second example of the index representing the difference in throughput:

The total throughput when the eNB 2 performs blanking is calculated from the TB11;

The total throughput when the eNB 2 performs blanking is calculated from the TB21, and scheduling information of the UE 3; and The difference between the total throughputs of the two assumptions are calculated.

In a third example of the index representing the difference in throughput:

The difference between the total throughputs of the two assumptions are calculated from $\alpha_1$, and scheduling information of the UE 3.

If the total throughput over the resource 1, assuming there is no interference of the eNB2, is higher, then the eNB 2 decides to be blank the scheduling resource 1. If the eNB 2 alike determines for the scheduling resource 2 that the total throughput over the scheduling resource 2 assuming there is interference from the eNB 2 is higher, then the eNB 2 decides not to be blank the scheduling resource 2.

TABLE 2

Blanking decision result of eNB 2

| | Scheduling resources | |
|---|---|---|
| | Scheduling resource 1 | Scheduling resource 2 |
| Blanked or not | Blanked | Not blanked |

The eNB 2 flags the scheduling resource 2 which is not blanked to 0, and the scheduling resource 1 which is blanked to 1, in a bitmap of the scheduling resources, and transmits the bitmap to the eNB 1 (the order of the corresponding resources in the bitmap is prescribed by the two eNBs, and the index of the scheduling resource 1 and the index of the scheduling resource 2 are prescribed in advance as 0 and 1), and FIG. 3 depicts the values of the respective bits in the bitmap.

Table 3

Bitmap of resources over which blanking is enabled, signaled by the eNB 2

| Resource indexes | Values in the bitmap |
|---|---|
| 0 | 1 |
| 1 | 0 |

The eNB 1 receives the bitmap transmitted by the eNB 2, and schedules the UE 1 over the scheduling resource 1, and the UE 2 over the scheduling resource 2, according to blanking conditions thereof.

A particular example of the second approach will be given below:

It is assumed that there are two eNBs in the system: an eNB 1 (a serving eNB) and an eNB 2 (a cooperating eNB), both of which cooperate in dynamic blanking;

There are two scheduling resources for the two eNBs above: a scheduling resource 1 and a scheduling resource 2; and There are two UEs served by the eNB 1, both of which may be scheduled over these two scheduling resources: a UE 1 and a UE 2, where the UE 1 is a CoMP-enabled UE, and the UE 2 is an non-CoMP-enabled UE.

At this time the network exchanges information in distributed dynamic blanking as follows.

The eNB 1 receives report information of the UE 1 and the UE 2, including RSRP reports, measured respectively by the UE 1 and the UE 2, of the eNB 1 to the two UEs, and respective single-point sub-band CQI reports of the eNB 1 to the UE 1 and the eNB 1 to the UE 2 over the two resources. The eNB 1 compares the RSRP reports of the UE 1 and the UE 2, where the RSRP of the UE 1 is more than the RSRP of the UE 2, and the sub-band CQI of the UE 1 is less than the sub-band CQI of the UE 2 over the scheduling resource 1. At this time the eNB 1 determines that the UE 1 is subjected to strong interference from the eNB 2 over the scheduling resource 1 and the UE 1 may have a better channel condition if there is no interference of the eNB 2.

Alternatively the eNB 1 receives report information of the UE 1 and the UE 2, including respective single-point sub-band CQI reports of the eNB 1 to the UE 1 and the UE 2 over the two resources, and a single-point sub-band CQI of the eNB 1 to the UE 1 when there is no interference from eNB1 and eNB2 (where the eNB 2 performs blanking). The eNB 1 takes the single-point sub-band CQI of the eNB 1 to the UE 2 as a threshold, and compares the single-point sub-band CQI of the eNB 1 to the UE 1 with the threshold, over the scheduling resource 1. If the single-point sub-band CQI of the eNB 1 to the UE 1 is less than the threshold, then the eNB 1 further compares the sub-band CQI of the eNB 1 to the UE 1 when there is no interference from eNB1 and eNB2 with the threshold. If the sub-band CQI of the eNB 1 to the UE 1 when there is no interference from eNB1 and eNB2 is more than the threshold, then the eNB 1 determines that the UE 1 is subjected to strong interference from the eNB 2 over the scheduling resource 1 and the UE 1 may have a better channel condition if there is no interference from the eNB 2.

If the NB 1 draws the same conclusion over the scheduling resource 2, then the eNB selects the scheduling resource 1 and the scheduling resource 2 as scheduling resources which is requested to be blanked by the eNB 2.

The eNB 1 signals to the eNB 2 the resources which the eNB 1 requested to be blanked, in a bitmap. In this bitmap the scheduling resource 1 and the scheduling resource 2 are flagged to 1.

The eNB2 receives the blanking request from the eNB 1, and decides blanking conditions of the scheduling resource 1 and the scheduling resource 2 respectively. Assumed that the eNB 2 decides to blank the scheduling resource 1 and not to blank the scheduling resource 2, according to channel conditions of the UEs served by the eNB 2.

The eNB 2 signals the result of the blanking decision to the eNB 1 in a bitmap, and if the index of the resource 1 and the index of the resource 2 are prescribed in advance to 0 and 1, then Table 4 depicts the values of respective bits in the bitmap.

TABLE 4

Bittnap of blanked resources, signaled by the eNB 2

| Resource indexes | Values in the bitmap |
|---|---|
| 0 | 1 |
| 1 | 0 |

The eNB 1 receives the result of the blanking decision transmitted by the eNB 2, and stores the decision of scheduling resource 1 being blanked and the scheduling resource 2 not being blanked.

The eNB 1 subsequently schedules the UEs over the scheduling resource 1 based upon the assumption that the eNB 2 performs blanking, and over the scheduling resource 2 based upon the assumption that the eNB 2 is doesn't perform blanking, until the eNB 1 receives a new blanking decision result of the eNB 2.

Figure 5:
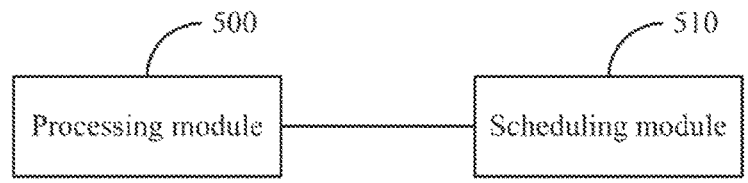
FIG. 5 illustrates a schematic structural diagram of a serving eNB in a system for scheduling a resource according to an embodiment of the invention.

As illustrated in FIG. 5, a serving eNB in a system for scheduling a resource according to an embodiment of the invention includes a processing module 500 and a scheduling module 510.

The processing module 500 is configured to determine a time-frequency resource which needs to be blanked by a cooperating eNB, according to channel information reported by a CoMP-enabled UE, and to notify the cooperating eNB of the time-frequency resource which needs to be blanked; and The scheduling module 510 is configured for the serving eNB to schedule the UE according to received decision, from the cooperating eNB, of whether to blank the resource.

Preferably the processing module 500 is configured to determine the time-frequency resource which needs to be blanked by the cooperating eNB, according to CSI of the serving eNB reported by the CoMP-enabled UE.

Preferably the processing module 500 is configured, for a time-frequency resource which can be scheduled to the CoMP-enabled UE to transmit a PDSCH signal, to perform pre-scheduling over the time-frequency resource according to the CST of the serving eNB reported by the CoMP-enabled UE assuming that the time-frequency resource is blanked by the cooperating eNB, and CSI of the serving eNB reported by a non-CoMP-enabled UE; to perform pre-scheduling over the time-frequency resource according to the CST of the serving eNB reported by the CoMP-enabled UE assuming that the time-frequency resource is not blanked by the cooperating eNB, and the CSI of the serving eNB reported by the non-CoMP-enabled UE; and to select a time-frequency resource over which the CoMP-enabled UE is pre-scheduled, from all the time-frequency resources over which pre-scheduling is performed, as the time-frequency resource which needs to be blanked by the cooperating eNB.

Preferably the processing module 500 is configured to transmit an indicator of the time-frequency resource which needs to be blanked, and scheduling information for pre-scheduling over the time-frequency resource to the cooperating eNB.

Preferably the indicator of the time-frequency resource is a resource index, or a resource bitmap; and the scheduling information for pre-scheduling over the time-frequency resource includes the parameter value representing a quality of transmission in pre-scheduling by the serving eNB over the time-frequency resource, or the parameter value representing a difference in quality of transmission in pre-scheduling by the serving eNB over the time-frequency resource.

Preferably the processing module 500 is configured to determine the time-frequency resource which needs to be blanked by the cooperating eNB, according to measurement report information reported by the CoMP-enabled UE.

Preferably the processing module 500 is configured, for a time-frequency resource which can be scheduled to the CoMP-enabled UE to transmit a PDSCH signal, to determine the time-frequency resource as the time-frequency resource which needs to be blanked by the cooperating eNB, after the measurement report information reported by the CoMP-enabled UE satisfies an interference condition.

Here if the measurement report information satisfies e interference condition, then it is determined that the cooperating eNB generates strong interference to transmission of the CoMP-enabled UE over the time-frequency resource and the quality of transmission of the CoMP-enabled UE can be improved by eliminating the strong interference from the cooperating eNB to transmission of the CoMP-enabled UE over the time-frequency resource.

Whether the measurement report information satisfies the interference condition can be determined in a number of ways, for example, a first threshold and a second threshold can be preset, measurement report information indicating interference among the measurement report information reported by the CoMP-enabled UE can be compared with the first threshold, strong interference from the cooperating eNB to transmission of the CoMP-enabled UE over the time-frequency resource can be determined from a result of comparison; measurement report information indicating no interference among the measurement report information reported by the CoMP-enabled UE can be compared with the second threshold, and it can be determined from a result of comparison that the quality of transmission of the CoMP-enabled UE can be improved by eliminating the strong interference from the cooperating eNB to transmission of the CoMP-enabled UE over the time-frequency resource, and then it can be determined the measurement report information satisfies the interference condition.

Preferably the processing module 500 is configured to transmit an indicator of the time-frequency resource which needs to be blanked to the cooperating eNB.

Preferably the processing module 500 is configured to transmit to the cooperating eNB a parameter representing a difference in transmission performance respectively when the time-frequency resource is blanked and not blanked by the cooperating eNB.

Preferably the scheduling module 510 is configured to schedule the UE according to lastly received decision, from the cooperating eNB, whether to blank the resource.

Preferably the cooperating eNB is an eNB capable of dynamic blanking.

An embodiment of the invention further provides a serving eNB in a system for scheduling a resource, including a transceiver module and a processor module, where:

The processor module is configured to determine a time-frequency resource which needs to be blanked by a cooperating eNB, according to channel information reported by a CoMP-enabled UE, and to schedule the UE according to received decision, from the cooperating eNB, of whether to blank the resource; and The transceiver module is configured to signal to the cooperating eNB the time-frequency resource which needs to be blanked, and to receive the decision, from the cooperating eNB, whether to blank the resource.

Preferably the processor module is configured to determine the time-frequency resource which needs to be blanked by the cooperating eNB, according to CSI of the serving eNB reported by the CoMP-enabled UE.

Preferably the processor module is configured, for a time-frequency resource which can be scheduled to the CoMP-enabled UE to transmit a PDSCH signal, to perform pre-scheduling over the time-frequency resource according to the CSI of the serving eNB reported by the CoMP-enabled UE assuming that the time-frequency resource is blanked by the cooperating eNB, and CSI of the serving eNB reported by a non-CoMP-enabled UE; to perform pre-scheduling over the time-frequency resource according to the CSI of the serving eNB reported by the CoMP-enabled UE assuming that the time-frequency resource is not blanked by the cooperating eNB, and the CSI of the serving eNB reported by the non-CoMP-enabled UE; and to select a time-frequency resource over which the CoMP-enabled UE is pre-scheduled, from all the time-frequency resources over which pre-scheduling is performed, as the time-frequency resource which needs to be blanked by the cooperating eNB.

Preferably the processor module is configured to transmit an indicator of the time-frequency resource which needs to be blanked, and scheduling information for pre-scheduling over the time-frequency resource to the cooperating eNB through the transceiver module.

Preferably the indicator of the time-frequency resource is a resource index, or a resource bitmap; and the scheduling information for pre-scheduling over the time-frequency resource includes the parameter value representing a quality of transmission in pre-scheduling by the serving eNB over the time-frequency resource, or the parameter value representing a difference in quality of transmission in pre-scheduling by the serving eNB over the time-frequency resource.

Preferably the processor module is configured to determine the time-frequency resource which needs to be blanked by the cooperating eNB, according to measurement report information reported by the CoMP-enabled UE.

Preferably the processor module is configured, for a time-frequency resource which can be scheduled to the CoMP-enabled UE to transmit a PDSCH signal, to determine the time-frequency resource as the time-frequency resource which needs to be blanked by the cooperating eNB, after the measurement report information reported by the CoMP-enabled UE satisfies an interference condition.

Here if the measurement report information satisfies the interference condition, then it is determined that the cooperating eNB generates strong interference to transmission of the CoMP-enabled UE over the time-frequency resource and the quality of transmission of the CoMP-enabled UE can be improved by eliminating the strong interference from the cooperating eNB to transmission of the CoMP-enabled UE over the time-frequency resource.

Whether the measurement report information satisfies the interference condition can be determined in a number of ways, for example, a first threshold and a second threshold can be preset, measurement report information indicating interference among the measurement report information reported by the CoMP-enabled LIE can be compared with the first threshold, strong interference from the cooperating eNB to transmission of the CoMP-enabled UE over the time-frequency resource can be determined from a result of comparison, measurement report information indicating no interference among the measurement report information reported by the CoMP-enabled UE can be compared with the second threshold, and it can be determined from a result of comparison that the quality of transmission of the CoMP-enabled UE can be improved by eliminating the strong interference from the cooperating eNB to transmission of the CoMP-enabled UE over the time-frequency resource, and then it can be determined the measurement report information satisfies the interference condition.

Preferably the processor module is configured to transmit an indicator of the time-frequency resource which needs to be blanked to the cooperating eNB through the transceiver module.

Preferably the processor module is configured to transmit to the cooperating eNB parameter representing a difference in transmission performance respectively when the time-frequency resource is blanked and not blanked by the cooperating eNB.

Preferably the transceiver module is configured to schedule the UE according to lastly received decision, from the cooperating eNB, whether to blank the resource.

Preferably the cooperating eNB is an eNB capable of dynamic blanking.

Figure 6:
FIG. 6 illustrates a schematic structural diagram of a cooperating eNB in a system for scheduling a resource according to an embodiment of the invention.

As illustrated in FIG. 6, a cooperating eNB in a system for scheduling a resource according to an embodiment of the invention includes a determining module 600 and a notification module 610, where:

The determining module 600 is configured to determine a time-frequency resource which needs to be blanked, according to received notification from a serving eNB; and The notification module 610 is configured to decide whether to blank the time-frequency resource which needs to be blanked, and to return decision of whether to blank the resource to the serving eNB so that the serving eNB schedules a UE according to the received decision.

Preferably the determining module 600 is configured, for a time-frequency resource which needs to be blanked, after the time-frequency resource is determined as a time-frequency resource which can be blanked, to determine the parameter value of a quality of transmission of the cooperating eNB when the time-frequency resource is not blanked by the cooperating eNB, and to determine the parameter values of the quality of transmission of the serving eNB respectively when the time-frequency resource is blanked and not blanked by the cooperating eNB, or to determine the difference between the parameter values of the quality of transmission of the serving eNB respectively when the time-frequency resource is blanked and not blanked by the cooperating eNB; and to decide whether to blank the time-frequency resource which needs to be blanked, according to the determined parameter value of the quality of transmission of the cooperating eNB, and the determined parameter values of the quality of transmission of the serving eNB or difference between the parameter values of the quality of transmission.

Preferably the determining module 600 is configured, if the transmission performance of the serving eNB, when the time-frequency resource is blanked by the cooperating eNB, is determined to be no lower than the total transmission performance of the cooperating eNB and the serving eNB when the time-frequency resource is not blanked by the cooperating eNB, according to the parameter value of the quality of transmission of the cooperating eNB when the time-frequency resource is not blanked by the cooperating eNB, and the parameter values of the quality of transmission of the serving eNB respectively when the time-frequency resource is blanked and not blanked by the cooperating eNB, for the cooperating eNB to decide to blank the time-frequency resource which needs to be blanked; otherwise, to decide not to blank the time-frequency resource which needs to be blanked; or If the transmission performance of the serving eNB, when the time-frequency resource is blanked by the cooperating eNB, is determined to be no lower than the total transmission performance of the cooperating eNB and the serving eNB when the time-frequency resource is not blanked by the cooperating eNB, according to the parameter value of the quality of transmission of the cooperating eNB when the time-frequency resource is not blanked by the cooperating eNB, and the difference between the parameter values of the quality of transmission of the serving eNB respectively when the time-frequency resource is blanked and not blanked by the cooperating eNB, for the cooperating eNB to decide to blank the time-frequency resource which needs to be blanked; otherwise, to decide not to blank the time-frequency resource which needs to be blanked.

Preferably the determining module 600 is configured to determine N time-frequency resources with the lowest qualities of channel from time-frequency resources which can be blanked, where N represents a positive integer; and if the time-frequency resource which needs to be blanked is included among the determined N time-frequency resources with the lowest qualities of channel, to decide to blank the time-frequency resource which needs to be blanked; otherwise, to decide not to blank the time-frequency resource which needs to be blanked.

In an implementation, the serving eNB can alternatively be a cooperating eNB, and the cooperating eNB can alternatively be a serving eNB, in different scenarios, so the serving eNB and the cooperating eNB can be integrated in a single entity (that is, the modules of the serving eNB and the cooperating eNB can be integrated in the entity), and the functions of the serving eNB or the functions of the cooperating eNB can be enabled selectively as needed.

An embodiment of the invention further provides another cooperating eNB in a system for scheduling a resource, including a transceiver module and a processor module, where:

The processor module is configured to determine a time-frequency resource which needs to be blanked, according to received notification from a serving eNB, and to determine whether to blank the time-frequency resource which needs to be blanked; and The transceiver module is configured to receive the notification from the serving eNB, and to return decision whether to blank the resource to the serving eNB so that the serving eNB schedules a UE according to the received decision.

Preferably the processor module is configured, for a time-frequency resource which needs to be blanked, after the time-frequency resource is determined as a time-frequency resource which can be blanked, to determine the parameter value of a quality of transmission of the cooperating eNB when the time-frequency resource is not blanked by the cooperating eNB, and to determine the parameter values of the quality of transmission of the serving eNB respectively when the time-frequency resource is blanked and not blanked by the cooperating eNB, or to determine the difference between the parameter values of the quality of transmission of the serving eNB respectively when the time-frequency resource is blanked and not blanked by the cooperating eNB; and to decide whether to blank the time-frequency resource which needs to be blanked, according to the determined parameter value of the quality of transmission of the cooperating eNB, and the determined parameter values of the quality of transmission of the serving eNB or difference between the parameter values of the quality of transmission.

Preferably the processor module is configured, if the transmission performance of the serving eNB, when the time-frequency resource is blanked by the cooperating eNB, is determined to be no lower than the total transmission performance of the cooperating eNB and the serving eNB when the time-frequency resource is not blanked by the cooperating eNB, according to the parameter value of the quality of transmission of the cooperating eNB when the time-frequency resource is not blanked by the cooperating eNB, and the parameter values of the quality of transmission of the serving eNB respectively when the time-frequency resource is blanked and not blanked by the cooperating eNB, for the cooperating eNB to decide to blank the time-frequency resource which needs to be blanked; otherwise, to decide not to blank the time-frequency resource which needs to be blanked; or If the transmission performance of the serving eNB, when the time-frequency resource is blanked by the cooperating eNB, is determined to be no lower than the total transmission performance of the cooperating eNB and the serving eNB when the time-frequency resource is not blanked by the cooperating eNB, according to the parameter value of the quality of transmission of the cooperating eNB when the time-frequency resource is not blanked by the cooperating eNB, and the difference between the parameter values of the quality of transmission of the serving eNB respectively when the time-frequency resource is blanked and not blanked by the cooperating eNB, for the cooperating eNB to decide to blank the time-frequency resource which needs to be blanked; otherwise, to decide not to blank the time-frequency resource which needs to be blanked.

Preferably the processor module is configured to determine N time-frequency resources with the lowest qualities of channel from time-frequency resources which can be blanked, where N represents a positive integer; and if the time-frequency resource which needs to be blanked is included among the determined N time-frequency resources with the lowest qualities of channel, to decide to blank the time-frequency resource which needs to be blanked; otherwise, to decide not to blank the time-frequency resource which needs to be blanked.

In an implementation, the serving eNB can alternatively be a cooperating eNB, and the cooperating eNB can alternatively be a serving eNB, in different scenarios, so the serving eNB and the cooperating eNB can be integrated in a single entity (that is, the modules of the serving eNB and the cooperating eNB can be integrated in the entity), and the functions of the serving eNB or the functions of the cooperating eNB can be enabled selectively as needed.

Based upon the same inventive idea, embodiments of the invention further provide a method for scheduling a resource by a serving eNB, and a method for transmitting blanking information by a cooperating eNB, and since these methods address the problem under a similar principle to the system for scheduling a resource according to the embodiment of the invention, reference can be made to the implementation of the system for implementations of the methods, so a repeated description thereof will be omitted here.

Figure 7:
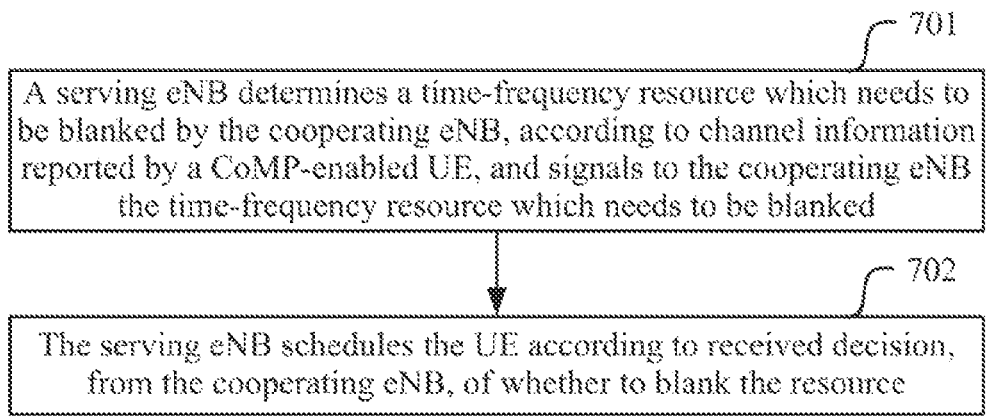
FIG. 7 illustrates a schematic flow chart of a method for scheduling a resource by a serving eNB according to an embodiment of the invention.

As illustrated in FIG. 7, a method for scheduling a resource by a serving eNB according to an embodiment of the invention includes the following operations:

Operation 701. A serving eNB determines a time-frequency resource which needs to be blanked by the cooperating eNB, according to channel information reported by a CoMP-enabled UE, and notifies the cooperating eNB of the time-frequency resource over which to be blanked; and Operation 702. The serving eNB schedules the UE according to received decision, from the cooperating eNB, of whether to blank the resource.

In an implementation, the respective eNBs can be configured respectively by a higher layer of a network to or not to be capable of dynamic blanking in such a way that the network configures an eNB capable of dynamic blanking to decide whether to accept a blanking request, according to a condition of the present eNB, and to broadcast, to nearby eNBs, the notification whether the blanking request is accepted.

The network configures the eNB capable of dynamic blanking to decide whether to accept the blanking request, according to a traffic condition, a channel condition, etc., of the present eNB.

Preferably the serving eNB signals the time-frequency resource which needs to be blanked, only to a cooperating eNB capable of dynamic blanking.

Here the serving eNB can determine whether the cooperating eNB is an eNB capable of dynamic blanking, according to configuration by a higher layer; or can determine whether the cooperating eNB is an eNB capable of dynamic blanking, according to notification transmitted by the cooperating eNB.

A result of last determination whether the cooperating eNB is an eNB capable of dynamic blanking will apply after the cooperating eNB is determined as an eNB capable of dynamic blanking, until new notification, transmitted by the cooperating eNB, whether it is an eNB capable of dynamic blanking, or new configuration by the higher layer is received.

Here there may be a number of approaches in which the time-frequency resource is scheduled according to the embodiment of the invention, and which will be described below respectively.

In a first approach, the serving eNB determines the time-frequency resource which needs to be blanked by the cooperating eNB, according to CSI of the serving eNB reported by the COMP-enabled UE.

Here for a time-frequency resource which can be scheduled to the COMP-enabled UE to transmit a PDSCH signal, the serving eNB performs pre-scheduling over the time-frequency resource according to the CSI of the serving eNB reported by the CoMP-enabled UE assuming that the time-frequency resource is blanked by the cooperating eNB, and CSI of the serving eNB reported by the non-CoMP-enabled UE; and performs pre-scheduling over the time-frequency resource according to the CSI of the serving eNB reported by the CoMP-enabled UE assuming that the time-frequency resource is not blanked by the cooperating eNB, and the CSI of the serving eNB reported by the non-COMP-enabled UE; and The serving eNB selects a time-frequency resource over which the CoMP-enabled is pre-scheduled, from all the time-frequency resources over which pre-scheduling is performed, as the time-frequency resource which needs to be blanked by the cooperating eNB.

Here the serving eNB signals the time-frequency resource which needs to be blanked, to the cooperating eNB by transmitting an indicator of the time-frequency resource which needs to be blanked, and scheduling information for pre-scheduling over the time-frequency resource to the cooperating eNB.

Preferably the indicator of the time-frequency resource is a resource index, or a resource bitmap; and The scheduling information for pre-scheduling over the time-frequency resource includes the parameter value representing a quality of transmission in pre-scheduling by the serving eNB over the time-frequency resource, or the parameter value representing a difference in quality of transmission in pre-scheduling by the serving eNB over the time-frequency resource.

In a second approach, the serving eNB determines the time-frequency resource which needs to be blanked by the cooperating eNB, according to measurement report information reported by the CoMP-enabled UE.

Preferably for a time-frequency resource which can be scheduled to the CoMP-enabled UE to transmit a PDSCH signal, the serving eNB determines the time-frequency resource as the time-frequency resource which needs to be blanked by the cooperating eNB, after the measurement report information reported by the CoMP-enabled UE satisfies an interference condition.

Here if the measurement report information satisfies the interference condition, then it is determined that the cooperating eNB generates strong interference to transmission of the CoMP-enabled UE over the time-frequency resource and the quality of transmission of the CoMP-enabled UE can be improved by eliminating the strong interference from the cooperating eNB to transmission of the CoMP-enabled UE over the time-frequency resource.

Whether the measurement report information satisfies the interference condition can be determined in a number of ways, for example, a first threshold and a second threshold can be preset, measurement report information indicating interference among the measurement report information reported by the CoMP-enabled UE can be compared with the first threshold, strong interference of the cooperating eNB to transmission of the CoMP-enabled UE over the time-frequency resource can be determined from a result of comparison, measurement report information indicating no interference among the measurement report information reported by the CoMP-enabled UE can be compared with the second threshold, and it can be determined from a result of comparison that the quality of transmission of the CoMP-enabled UE can be improved by eliminating the strong interference from the cooperating eNB to transmission of the COMP-enabled UE over the time-frequency resource, and then it can be determined the measurement report information satisfies the interference condition.

Preferably the serving eNB signals the time-frequency resource which needs to be blanked, to the cooperating eNB by transmitting an indicator of the time-frequency resource which needs to be blanked to the cooperating eNB.

Preferably the serving eNB notifying the time-frequency resource which needs to be blanked, to the cooperating eNB further comprises:

The serving eNB transmits to the cooperating eNB a parameter representing a difference in transmission performance respectively when the time-frequency resource is blanked and not blanked by the cooperating eNB.

Preferably the serving eNB schedules the UE according to the received decision, from the cooperating eNB, whether to blank the resource as follows:

The serving eNB schedules the UE according to lastly received decision, from the cooperating eNB, whether to blank the resource.

It shall be noted that as long as the operation 701 is performed once in the second approach, the operation 702 can be performed directly for scheduling as needed throughout a preset length of time, that is, scheduling can be performed according to lastly received decision until the preset length of time expires, and then the operation 701 can be performed again, but the operation 702 may be performed for scheduling as needed instead of being performed immediately after the operation 701 is performed again.

Figure 8:
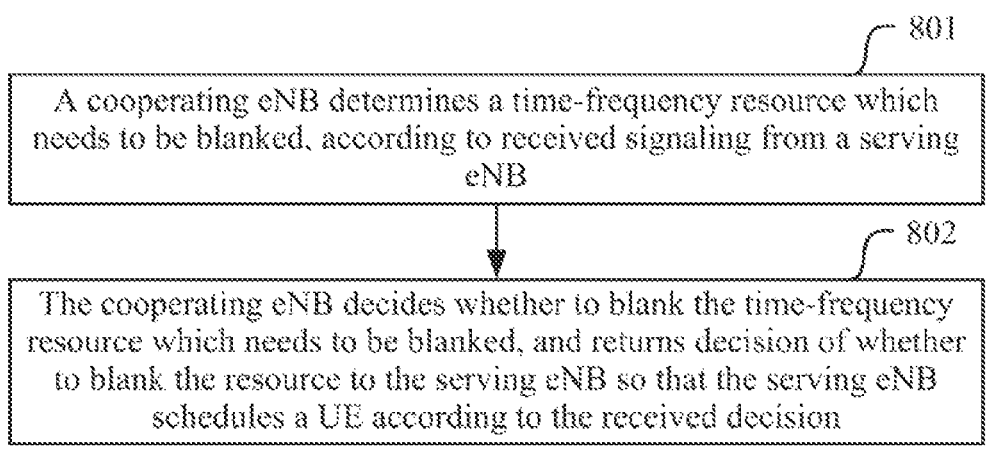
FIG. 8 illustrates a schematic flow chart of a method for scheduling a resource by a cooperating eNB according to an embodiment of the invention.

As illustrated in FIG. 8, a method for transmitting blanking information by a cooperating eNB according to an embodiment of the invention includes the following operations:

Operation 801. A cooperating eNB determines a time-frequency resource which needs to be blanked, according to received notification from a serving eNB; and Operation 802. The cooperating eNB decides whether to blank the time-frequency resource which needs to be blanked, and returns decision whether to blank the resource to the serving eNB so that the serving eNB schedules a UE according to the received decision.

Preferably the cooperating eNB decides whether to blank the time-frequency resource which needs to be blanked as follows:

For a time-frequency resource which needs to be blanked, after the time-frequency resource is determined as a time-frequency resource which can be blanked, the cooperating eNB determines the parameter value of a quality of transmission of the cooperating eNB when the time-frequency resource is not blanked by the cooperating eNB, and determines the parameter values of the quality of transmission of the serving eNB respectively when the time-frequency resource is blanked and not blanked by the cooperating eNB, or determines the difference between the parameter values of the quality of transmission of the serving eNB respectively when the time-frequency resource is blanked and not blanked by the cooperating eNB; and The cooperating eNB decides whether to blank the time-frequency resource which needs to be blanked, according to the determined parameter value of the quality of transmission of the cooperating eNB, and the determined parameter values of the quality of transmission of the serving eNB or difference between the parameter values of the quality of transmission.

Furthermore the cooperating eNB decides whether to blank the time-frequency resource which needs to be blanked as follows:

If the transmission performance of the serving eNB, when the time-frequency resource is blanked by the cooperating eNB, is determined to be no lower than the total transmission performance of the cooperating eNB and the serving eNB when the time-frequency resource is not blanked by the cooperating eNB, according to the parameter value of the quality of transmission of the cooperating eNB when the time-frequency resource is not blanked by the cooperating eNB, and the parameter values of the quality of transmission of the serving eNB respectively when the time-frequency resource is blanked and not blanked by the cooperating eNB, then the cooperating eNB decides to blank the time-frequency resource; otherwise, to decide not to blank the time-frequency resource which needs to be blanked; or If the transmission performance of the serving eNB, when the time-frequency resource is blanked by the cooperating eNB, is determined to be no lower than the total transmission performance of the cooperating eNB and the serving eNB when the time-frequency resource is not blanked by the cooperating eNB, according to the parameter value of the quality of transmission of the cooperating eNB when the time-frequency resource is not blanked by the cooperating eNB, and the difference between the parameter values of the quality of transmission of the serving eNB respectively when the time-frequency resource is blanked and not blanked by the cooperating eNB, for the cooperating eNB to decide to blank the time-frequency resource which needs to be blanked; otherwise, to decide not to blank the time-frequency resource which needs to be blanked.

Preferably the cooperating eNB decides whether to blank the time-frequency resource which needs to be blanked as follows:

The cooperating eNB determines N time-frequency resources with the lowest qualities of channel from time-frequency resources which can be blanked, where N represents a positive integer; and If the time-frequency resource which needs to be blanked is included among the determined N time-frequency resources with the lowest qualities of channel, then the cooperating eNB decides to blank the time-frequency resource which needs to be blanked; otherwise, the cooperating eNB decides not to blank the time-frequency resource which needs to be blanked.

Here FIG. 7 and FIG. 8 can be integrated into a single flow of a method for scheduling a resource, that is, firstly the operation 701, then the operation 801 and the operation 802, and finally the operation 702 are performed.

It shall be noted that as long as the operations 701, 801 and 802 are performed once in the second approach, the operation 702 can be performed directly for scheduling as needed throughout a preset length of time, that is, scheduling can be performed according to lastly received notification until the preset length of time expires, and then the operations 701, 801 and 802 can be performed again, but the operation 702 may be performed for scheduling as needed instead of being performed immediately after the operations 701, 801 and 802 are performed again.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for scheduling a resource, the method comprising:

determining, by a serving base station, a time-frequency resource which needs to be blanked by a cooperating base station, according to channel information reported by a Coordinated Multi-Point (CoMP)-enabled User Equipment (UE), and notifying, by the serving base station, the cooperating base station of the time-frequency resource which needs to be blanked; and scheduling, by the serving base station, the UE according to received decision, from the cooperating base station, of whether to blank the resource;

wherein determining, by the serving base station, the time-frequency resource which needs to be blanked by the cooperating base station comprises:

determining, by the serving base station, the time-frequency resource which needs to be blanked by the cooperating base station, according to Channel State Information (CSI) of the serving base station reported by the CoMP-enabled UE; and wherein determining, by the serving base station, the time-frequency resource which needs to be blanked by the cooperating base station further comprises:

for a time-frequency resource which can be scheduled to the CoMP-enabled UE to transmit a Physical Downlink Shared Channel (PDSCH) signal, performing, by the serving base station, pre-scheduling over the time-frequency resource according to the CSI of the serving base station reported by the CoMP-enabled UE assuming that the time-frequency resource is blanked by the cooperating base station, and CSI of the serving base station reported by a non-CoMP-enabled UE; and performing pre-scheduling over the time-frequency resource according to the CSI of the serving base station reported by the CoMP-enabled UE assuming that the time-frequency resource is not blanked by the cooperating base station, and the CSI of the serving base station reported by the non-CoMP-enabled UE; and selecting, by the serving base station, a time-frequency resource over which the CoMP-enabled UE is pre-scheduled, from all the time-frequency resources over which pre-scheduling is performed, as the time-frequency resource which needs to be blanked by the cooperating base station.

2. The method according to claim 1, wherein notifying, by the serving base station, the cooperating base station of the time-frequency resource which needs to be blanked comprises:
transmitting, by the serving base station, an indicator of the time-frequency resource which needs to be blanked, and scheduling information for pre-scheduling over the time-frequency resource to the cooperating base station.

3. The method according to claim 2, wherein the indicator of the time-frequency resource is a resource index, or a resource bitmap; and
the scheduling information for pre-scheduling over the time-frequency resource comprises a value of a parameter representing a quality of transmission in pre-scheduling by the serving base station over the time-frequency resource, or the value of a parameter representing a difference in quality of transmission in pre-scheduling by the serving base station over the time-frequency resource.

4. The method according to claim 1, wherein determining, by the serving base station, the time-frequency resource which needs to be blanked by the cooperating base station comprises:
determining, by the serving base station, the time-frequency resource which needs to be blanked by the cooperating base station, according to measurement report information reported by the CoMP-enabled UE.

5. The method according to claim 4, wherein determining, by the serving base station, the time-frequency resource which needs to be blanked by the cooperating base station comprises:
for a time-frequency resource which can be scheduled to the CoMP-enabled UE to transmit a PDSCH signal, determining, by the serving base station, the time-frequency resource as the time-frequency resource which needs to be blanked by the cooperating base station, after the measurement report information reported by the CoMP-enabled UE satisfies an interference condition.

6. The method according to claim 4, wherein notifying, by the serving base station, the cooperating base station of the time-frequency resource which needs to be blanked comprises:
transmitting, by the serving base station, an indicator of the time-frequency resource which needs to be blanked to the cooperating base station.

7. A method for scheduling a resource, the method comprising:
determining, by a cooperating base station, a time-frequency resource which needs to be blanked, according to received notification from a serving base station; and
deciding, by the cooperating base station, whether to blank the time-frequency resource which needs to be blanked, and returning the decision of whether to blank the resource to the serving base station so that the serving base station schedules a UE according to the received decision;
wherein deciding, by the cooperating base station, whether to blank the time-frequency resource which needs to be blanked comprises:
for a time-frequency resource which needs to be blanked, after the time-frequency resource is determined as a time-frequency resource which can be blanked, determining, by the cooperating base station, the parameter value of a quality of transmission of the cooperating base station when the time-frequency resource is not blanked by the cooperating base station, and determining the parameter values of the quality of transmission of the serving base station respectively when the time-frequency resource is blanked and not blanked by the cooperating base station, or determining the difference between the parameter values of the quality of transmission of the serving base station respectively when the time-frequency resource is blanked and not blanked by the cooperating base station; and
deciding, by the cooperating base station, whether to blank the time-frequency resource which needs to be blanked, according to the determined parameter value of the quality of transmission of the cooperating base station, and the determined parameter values of the quality of transmission of the serving base station or difference between the parameter values of the quality of transmission of the serving base station.

8. The method according to claim 7, wherein deciding, by the cooperating base station, whether to blank the time-frequency resource which needs to be blanked, according to the determined parameter value of the quality of transmission of the cooperating base station, and the determined parameter values of the quality of transmission of the serving base station or difference between the parameter values of the quality of transmission comprises:
if the transmission performance of the serving base station when the time-frequency resource is blanked by the cooperating base station is determined to be no lower than the total transmission performance of the cooperating base station and the serving base station when the time-frequency resource is not blanked by the cooperating base station, according to the parameter value of the quality of transmission of the cooperating base station when the time-frequency resource is not blanked by the cooperating base station, and the parameter values of the quality of transmission of the serving base station respectively when the time-frequency resource is blanked and not blanked by the cooperating base station, then deciding, by the cooperating base station, to blank the time-frequency resource which needs to be blanked; otherwise, deciding not to blank the time-frequency resource which needs to be blanked; or
if the transmission performance of the serving base station, when the time-frequency resource is blanked by the cooperating base station, is determined to be no lower than the total transmission performance of the cooperating base station and the serving base station when the time-frequency resource is not blanked by the cooperating base station, according to the parameter value of the quality of transmission of the cooperating base station when the time-frequency resource is not blanked by the cooperating base station, and the difference between the parameter values of the quality of transmission of the serving base station respectively when the time-frequency resource is blanked and not blanked by the cooperating base station, then deciding, by the cooperating base station, to blank the time-frequency resource which needs to be blanked; otherwise, deciding not to blank the time-frequency resource which needs to be blanked.

9. A serving base station for scheduling a resource, the serving base station comprising:
a processor configured to determine a time-frequency resource which needs to be blanked by a cooperating base station, according to channel information reported by a CoMP-enabled UE, and to schedule the UE according to received decision, from the cooperating base station, of whether to blank the resource; and a transceiver configured to notify the cooperating base station of the time-frequency resource which needs to be blanked, and to receive the decision, from the cooperating base station, whether to blank the resource;

wherein processor is further configured:

for a time-frequency resource which can be scheduled to the CoMP-enabled UE to transmit a PDSCH signal, to perform pre-scheduling over the time-frequency resource according to the CSI of the serving base station reported by the CoMP-enabled UE assuming that the time-frequency resource is blanked by the cooperating base station, and CSI of the serving base station reported by a non-CoMP-enabled UE; to perform pre-scheduling over the time-frequency resource according to the CSI of the serving base station reported by the CoMP-enabled UE assuming that the time-frequency resource is not blanked by the cooperating base station, and the CSI of the serving base station reported by the non-CoMP-enabled UE; and to select a time-frequency resource over which the CoMP-enabled UE is pre-scheduled, from all the time-frequency resources over which pre-scheduling is performed, as the time-frequency resource which needs to be blanked by the cooperating base station.

10. The serving base station according to claim 9, wherein the processor is configured:

to transmit an indicator of the time-frequency resource which needs to be blanked, and scheduling information for pre-scheduling over the time-frequency resource to the cooperating base station.

11. The serving base station according to claim 10, wherein the indicator of the time-frequency resource is a resource index, or a resource bitmap; and the scheduling information for pre-scheduling over the time-frequency resource comprises the parameter value representing a quality of transmission in pre-scheduling by the serving base station over the time-frequency resource, or the parameter value representing a difference in quality of transmission in pre-scheduling by the serving base station over the time-frequency resource.

12. The serving base station according to claim 9, wherein the processor is configured:

to determine the time-frequency resource which needs to be blanked by the cooperating base station, according to measurement report information reported by the CoMP-enabled UE.

13. The serving base station according to claim 12, wherein the processor is configured:

for a time-frequency resource which can be scheduled to the CoMP-enabled UE to transmit a PDSCH signal, to determine the time-frequency resource as the time-frequency resource which needs to be blanked by the cooperating base station, after the measurement report information reported by the CoMP-enabled UE satisfies an interference condition.

14. A cooperating base station for scheduling a resource, the cooperating base station comprising:

a processor configured to determine a time-frequency resource which needs to be blanked, according to received notification from a serving base station, and to decide whether to blank the time-frequency resource which needs to be blanked; and a transceiver configured to receive the notification from the serving base station, and to return decision whether to blank the resource to the serving base station so that the base station schedules a UE according to the received decision;

wherein the processor is further configured:

for a time-frequency resource which needs to be blanked, after the time-frequency resource is determined as a time-frequency resource which can be blanked, to determine the parameter value of a quality of transmission of the cooperating base station when the time-frequency resource is not blanked by the cooperating base station, and to determine the parameter values of the quality of transmission of the serving base station respectively when the time-frequency resource is blanked and not blanked by the cooperating base station, or to determine the difference between the parameter values of the quality of transmission of the serving base station respectively when the time-frequency resource is blanked and not blanked by the cooperating base station; and to decide whether to blank the time-frequency resource which needs to be blanked, according to the determined parameter value of the quality of transmission of the cooperating base station, and the determined parameter values of the quality of transmission of the serving base station or difference between the parameter values of the quality of transmission of the serving base station.

* * * * *